July 26, 1938.  E. D. McNEAL  2,124,791
PROPELLER
Filed June 29, 1935  3 Sheets-Sheet 1
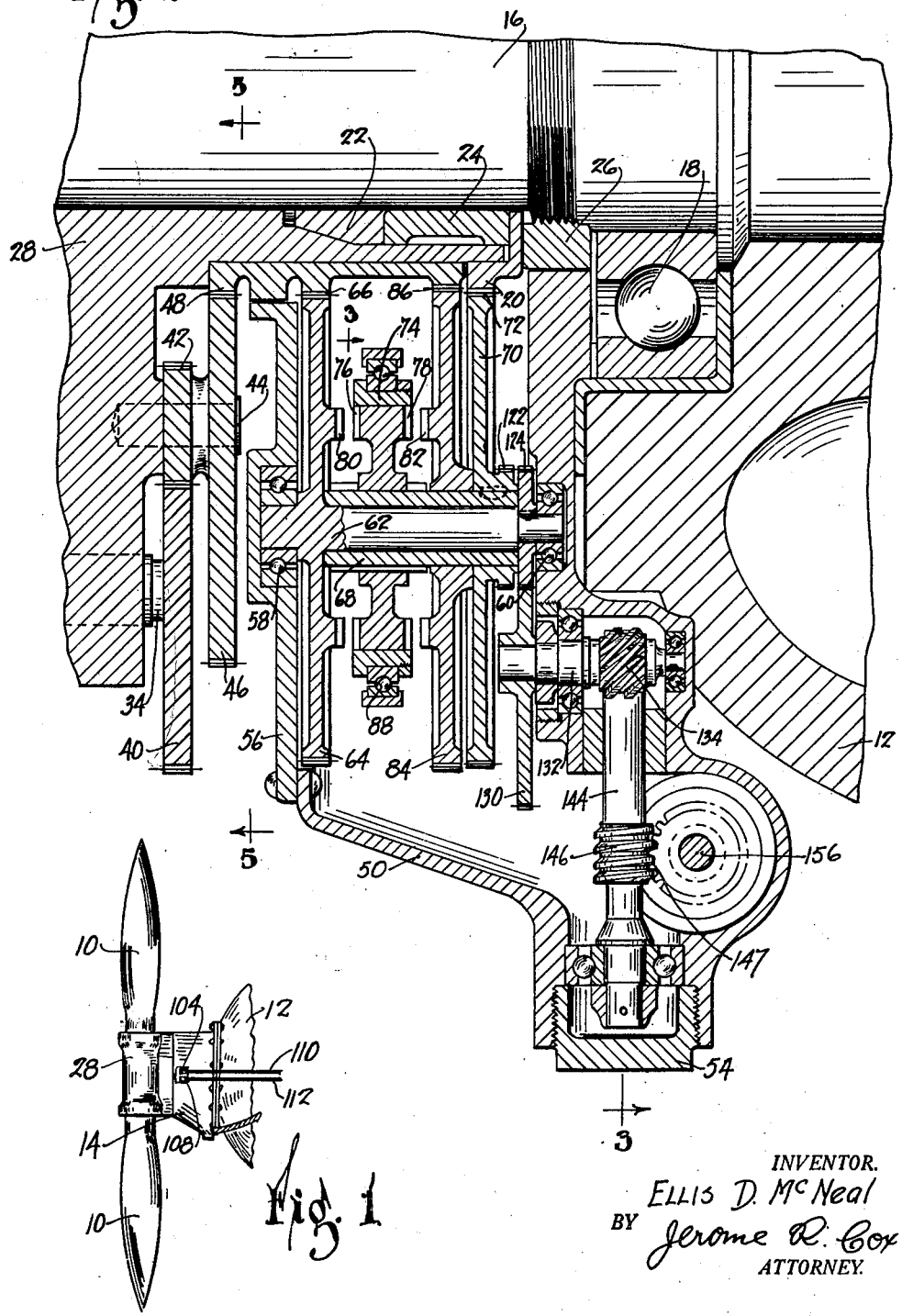
INVENTOR.
Ellis D. McNeal
BY Jerome R. Cox
ATTORNEY.

July 26, 1938.  E. D. McNEAL  2,124,791
PROPELLER
Filed June 29, 1935   3 Sheets-Sheet 2

INVENTOR.
ELLIS D. McNEAL
BY Jerome R. Cox
ATTORNEY

July 26, 1938.  E. D. McNEAL  2,124,791
PROPELLER
Filed June 29, 1935  3 Sheets-Sheet 3

INVENTOR.
ELLIS D. McNEAL
BY Jerome R. Cox
ATTORNEY.

Patented July 26, 1938

2,124,791

UNITED STATES PATENT OFFICE 2,124,791

PROPELLER

Ellis D. McNeal, South Bend, Ind., assignor to Bendix Products Corporation, South Bend, Ind., a corporation of Indiana Application June 29, 1935, Serial No. 29,043

3 Claims. (Cl. 170—163)

This invention relates to variable pitch propellers, and is disclosed in a propeller and pitch-changing mechanism therefor similar to that shown in a copending application of Marshall A. Smith, Jr., Serial No. 620,263, filed June 30, 1932, upon which invention this application is intended to disclose an improvement.

One of the objects of this invention is to utilize in a new and improved manner the rotation of the propeller to vary the pitch of the blades thereof.

A further object of the invention is to accomplish the variation of pitch by the use of a clutch so arranged as to clutch a pitch-changing gear to a continuously driven gear.

A further object of the invention is to use in such an arrangement a planetary gear system to reduce the gear speeds, and thus to control the pitch variation more effectively.

A further object is to utilize a single clutch element to drive the pitch-changing gear in either direction, to increase or decrease at will the pitch of the blades; the clutch element being arranged to connect a driven gear to a pitch-changing sleeve gear rotating at a speed proportionate to propeller shaft speed through either one or the other of two gear train gears, so that the pitch-changing sleeve gear is driven at will either slightly faster than or slightly slower than propeller shaft speed.

A further object of the invention is to provide a limit mechanism to disconnect the clutch automatically when a given pitch is attained, thus allowing the pilot his choice of the most efficient take-off pitch or the most efficient cruising pitch.

A further object is the provision of differential gears continuously driven, one by the propeller shaft and the other by the pitch-changing sleeve gear, so that whenever there is a difference in speed of the shaft and sleeve the differential gears operate the limit mechanism.

A further object of the invention is the operation of the single clutch element by a single clutch shifting fork operating either in one direction or the other at will.

One of the features of the invention is a means to adjust the limits for cruising and take-off pitch in accordance with the type of ship, the type of engine, and the altitude at which it is desired to fly.

A further object of the invention is to simplify the pitch-changing and limit mechanism so as to eliminate as many parts as possible.

Further objects and features of the invention will be apparent after a reading of the subjoined specification and claims and after consideration of the drawings, in which:

Figure 1 is a view, in elevation, of a portion of an airplane, showing especially portions of my improved pitch-changing and limit mechanism.

Figure 2 is a fragmentary sectional view showing a portion of the propeller shaft and a portion of the pitch-changing mechanism and the housing enclosing it.

Figure 3:
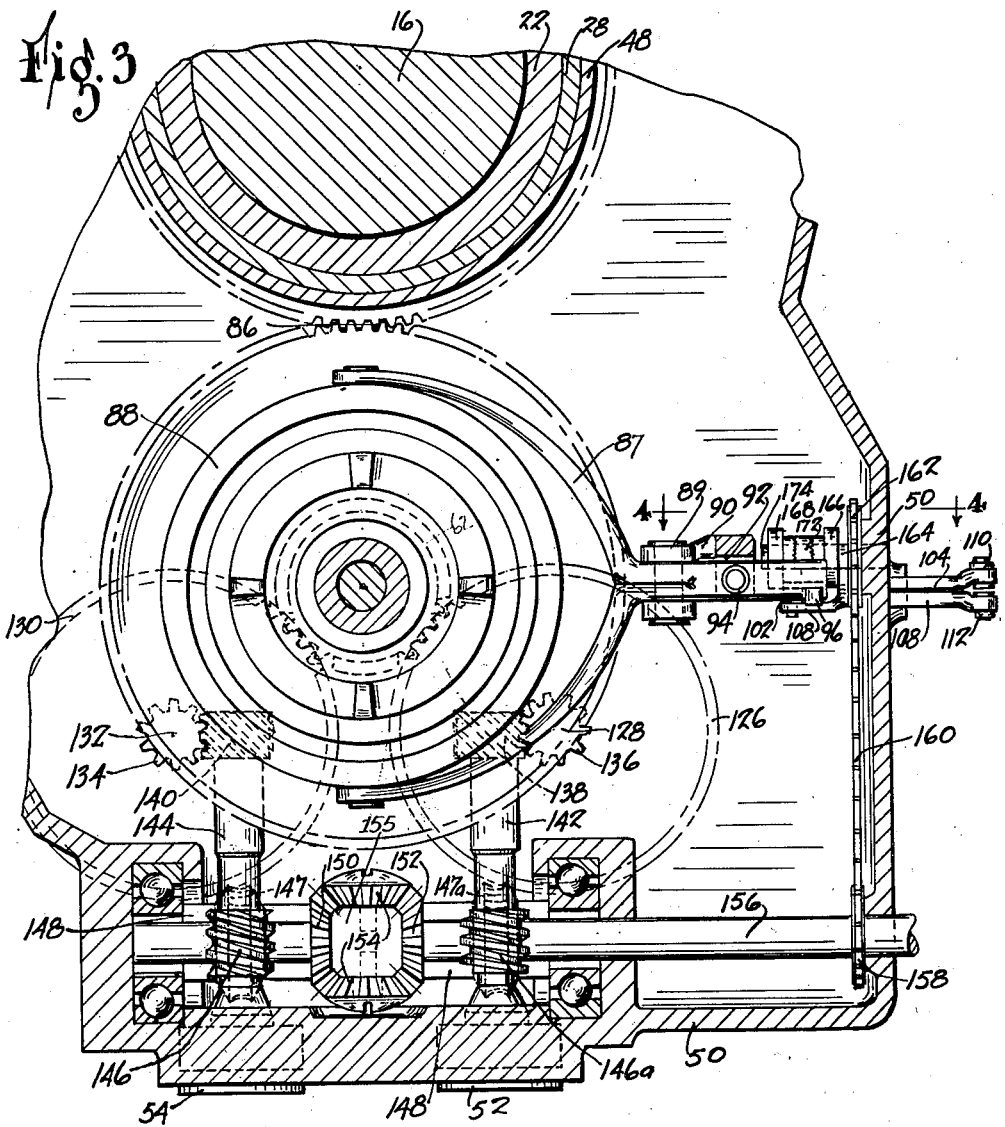
Figure 3 is a fragmentary sectional view taken substantially on the line 3—3 of Figure 2.

Referring in detail to the drawings, it may be seen that I have disclosed an airplane propeller 10 mounted in front of the nose 12 of an airplane engine and provided with a housing 14 for pitch-changing mechanism. Referring more especially to Figure 2, there may be seen the crank shaft 16 of the airplane engine mounted in bearings such as 18 in the forward end of the engine crank case 12 and arranged to have the propeller 10 secured to its forward end (toward the left in Figure 2.

The mechanism for changing the pitch of the blades of this propeller may be conveniently divided into three parts; that is, the parts which rotate continuously with the propeller at propeller speed around the propeller axis; the parts which are fixed to the crank case, and therefore are prevented from rotating with the propeller about the propeller axis; and the parts which at times rotate with the propeller about the propeller axis, but at other times rotate faster than the propeller, and at other times rotate slower than the propeller.

Figure 6:
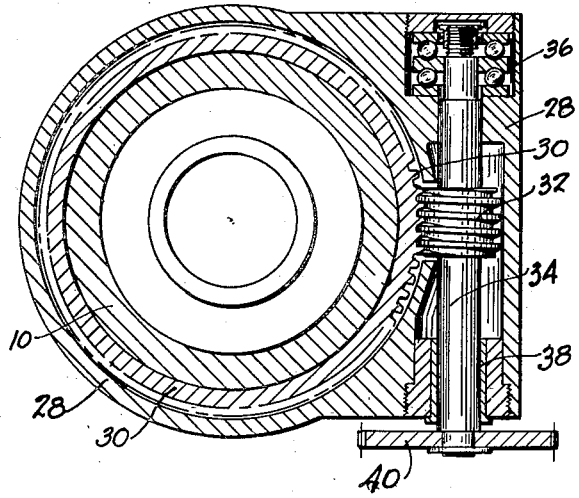
Figure 6 is a sectional view taken substantially on the line 6—6 of Figure 5.

The above mentioned parts, which rotate with the propeller at all times, include a gear 20 clamped between a nut 26, a wedge 22 and a shim 24. They also include the propeller 10 and the propeller hub 28, and the gears, stub shafts and worms carried by said propeller hub. Thus the propeller hub houses a pair of ring gears such as 30 (see Figure 6), each secured to the butt end of one of the propeller blades and arranged to rotate the propeller blades to vary the pitch thereof. Meshed with each of these gears is a worm such as 32 carried by a stub shaft 34, the shaft 34 being mounted in bearings such as 36 and 38 in the hub 28. The shaft 34 carries on one end thereof a gear 40 which meshes with a smaller gear 42 (Figure 2) carried by stub shaft 44, also mounted in the hub 28. The shaft 44 also has a larger gear 46 which meshes with a hub floating gear 48 rotatably mounted on a sleeve portion of the hub 28 and so arranged that when it revolves relative to the hub it drives the gear 46 and through it the worm 32 and the ring gear 30, thus turning the propeller blade to vary the pitch.

The parts of the pitch-changing mechanism not revolving around the propeller shaft include a housing A. This housing A includes a casting 50 and a plate 56 secured thereto. Nuts 52 and 54 (Figure 3) are screwed into casting 50 to close assembly opening and secure certain bearings therein. Mounted on bearings 58 and 60 (Figure 2) in said housing A is a stub shaft 62 having formed integral therewith a gear 64 having teeth meshed at all times with teeth formed at 66 on the exterior of the hub floating gear 48. Surrounding the stub shaft 62 is a sleeve 68 to which there is secured a gear wheel 70 having teeth meshed at 72 with the teeth formed on the gear 20. Splined on the sleeve 68 and slidable longitudinally thereof is a clutch element 74 having clutch faces 76 and 78, the former arranged to engage a clutch face 80 formed on the gear wheel 64. Thus when the clutch element is moved to the left (as in Figure 2), the sleeve 68 is clutched to the shaft 62 to rotate at the same speed about the shaft center. The sleeve 68 is continuously driven through the gear 20 and the gear wheel 70 by the propeller shaft, and thus when the said clutch is engaged, the gear wheel 64 and the hub floating gear 48 are also directly driven by the propeller shaft. However, the gear 64 has less teeth than the gear 70 (one less as shown), and therefore the hub floating gear 48 is driven at less than propeller shaft speed, thus causing relative movement between the hub floating gear 48 and the hub 28, thus causing rotation of the worm 32 to vary the pitch of the propeller.

The other clutch face 78 is arranged, when the clutch is moved (to the right in Figure 2), to engage with a clutch face 82 formed on a gear wheel 84 mounted for free rotation on the sleeve 68 but having teeth arranged to mesh at 86 with another set of teeth formed on the hub floating gear 48. Inasmuch as the gear 84 has more teeth than the gear 70 (one more as shown), when the clutch element 74 is connected to the gear 84, the hub floating gear 48 will be directly driven by the propeller shaft 16 so as to rotate faster than said propeller shaft, the driving being accomplished through the gear 20, the gear wheel 70, the sleeve 68, the clutch element 74 and the gear wheel 84. Thus when the clutch element 74 is moved to the right to engage the faces 78 and 82, the worm 32 will be driven in the opposite direction to that in which it is driven when the clutch element 74 is moved to the left. Thus, depending upon the direction in which the clutch element 74 is moved, the pitch-changing mechanism is effective to either increase or decrease the pitch of the blades and to continue to do so as long as the clutch element remains engaged. However, when the clutch element 74 is moved to its normal neutral position (as shown in Figure 2), the pitch will remain fixed, inasmuch as the drive through the worm 32 is irreversible. Thus it may be seen that the clutch element 74 constitutes a rotary idler member driven during rotation of the propeller at a speed bearing a fixed relation to propeller speed. Also the gear wheel 64 comprises a rotary idler member connected to the rotatable member formed by the hub floating gear 48 and normally driven by the hub floating gear 48 at a speed in excess of the speed of the clutch element 74 but arranged when clutched to the clutch element 74 to cause the hub floating gear 48 to rotate at less than propeller speed. Likewise the gear wheel 84 comprises a rotary idler member connected to said rotatable member and normally driven thereby at a speed less than the speed of the clutch element 74 but arranged when clutched to said clutch element 74 to cause the hub floating gear to rotate faster than the speed of the clutch element 74. Inasmuch as the clutch element 74 rotates always at a speed bearing a fixed relation to propeller speed, the gear wheels 64 and 74 are normally driven at a speed proportionally in excess of propeller speed and proportionally less than propeller speed.

As has been pointed out above, the hub floating gear 48 may rotate with the propeller shaft about the axis of the propeller shaft, and normally does so. However, at times, when it is desired to change the pitch, this hub floating gear rotates either faster than or slower than the propeller shaft and thus, as already described, drives the worm 32 to vary the pitch of the propeller blades.

Figure 4:
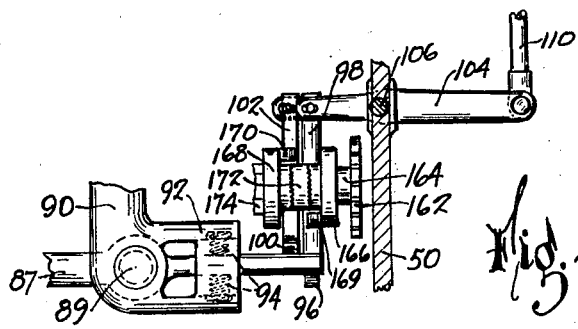
Figure 4 is a fragmentary sectional view taken substantially on the line 4—4 of Figure 3.
Figure 5:
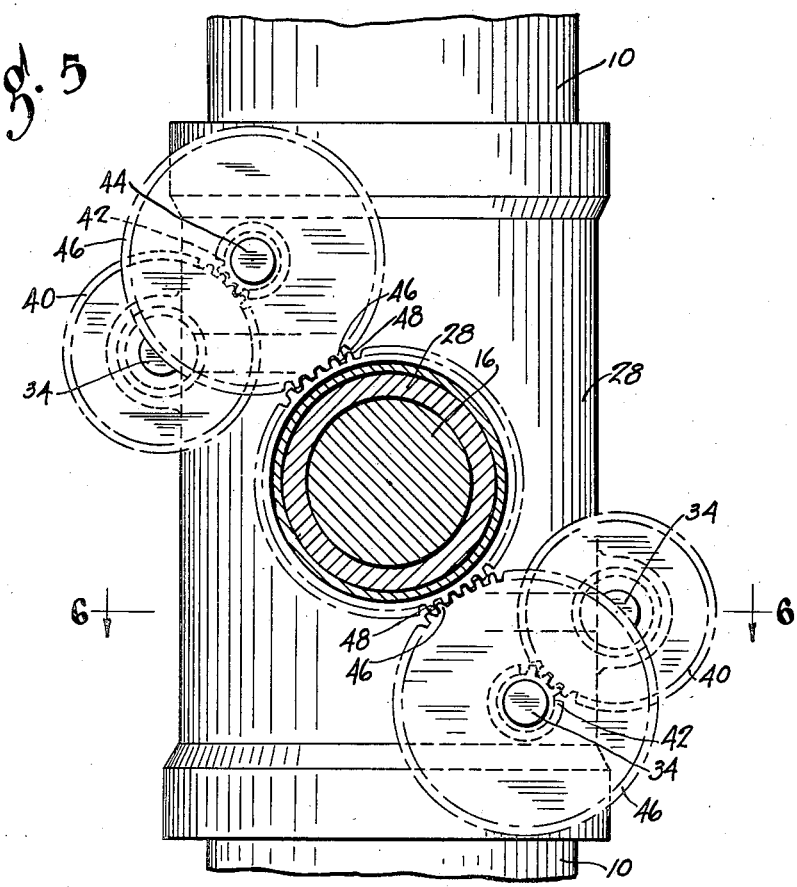
Figure 5 is a sectional view taken substantially on line 5—5 of Figure 2.

Means are also provided to shift the clutch element 74 so as to bring it into engagement with either the gear wheel 64 or the gear wheel 84. This means comprises a shifting fork 87 (Figure 3) and a bearing 88 (Figure 2) controlled by the ends of said fork. Referring especially to Figures 3 and 4, it may be seen that the fork 87 is pivoted as at 89 on a boss 90 on housing 50, said boss also being provided with fingers 92 between which there are inserted springs 94 for holding the fork normally in its neutral position so that the clutch element 74 is not engaged. The end of the shifting fork 86 opposite to the prongs which control the bearing 88 is arranged to be engaged by a lug 96 formed on one end of a link 98 or by a projection 100 formed on the end of a link 102. The link 98 is connected by a slot and pin with a lever 104 pivoted at 106 on the housing 50, and the link 102 is connected similarly to a similar lever 108 similarly pivoted on the housing 50. The opposite ends of the levers 104 and 108 are arranged to be actuated by rods 110 and 112 extending to the cockpit of the airplane, so that these rods may be operated by the pilot. Thus, by pushing upon rod 110, the lever 104 may be rotated to pull upon the link 98 and rotate the shifting fork 87 counterclockwise as shown in Figure 4, thus moving the clutch element 74 to the left as shown in Figure 2, and engaging the clutch faces 76 and 80. Similarly, a pull exerted upon rod 112 rotates the lever 108 to push the link 102 and rotate the shifting fork 87 clockwise as shown in Figure 4 and move the clutch element 74 into engagement with the gear wheel 84.

As suggested above, I also provide mechanism for limiting changes of pitch. Otherwise, whenever one or the other of the rods 110 and 112 should be actuated, the pitch would be increased or decreased as the case might be, until the pilot moved the rod back to its neutral position. By my pitch-limiting arrangement, not only are excessively dangerous changes in pitch prevented, but also the pilot can without difficulty always operate the propeller pitch-changing mechanism to bring the blades to the most efficient pitch. The gear wheel 70 (Figure 2) has formed integral therewith a small gear wheel 122 which thus rotates simultaneously with the sleeve 68 about the axis of the shaft 62. Adjacent thereto is another gear wheel 124 having the same diameter as the gear wheel 122. The gear wheel 124 is secured to the shaft 62 and rotates with it about the axis of the shaft 62, but is not connected to the sleeve 68. Whenever the shaft 62 and the sleeve 68 are revolving at the same rate of speed (which is whenever the clutch element 74 is engaged with the gear wheel 64), the gear wheels 122 and 124 rotate at the same rate of speed. Meshed with the gear wheel 122 is a larger gear wheel 126 mounted on a stub shaft 128. Similarly meshed with the gear wheel 124 is a similar larger gear wheel 130 carried by stub shaft 132. The shaft 132 carries a spiral gear 134 and the shaft 128 carries a spiral gear 136. The spiral gears 134 and 136 mesh respectively with spiral gears 138 and 140 carried by shafts 142 and 144 respectively. The shafts 142 and 144 each carry a worm such as the worms 146 and 146a (Figures 2 and 3) arranged to mesh with and drive gear wheels 147 and 147a carried by sleeves 148. The pitch of the worm 146 and wheel 147 differs from the pitch of the worm 146a and wheel 147a, so that when clutch 74 is disengaged from gear wheels 64 and 84 (i. e., when the clutch is in neutral), the sleeves 148 will both revolve at the same speed. Whenever the clutch is engaged with either gear wheel, one sleeve will revolve faster than the other. The sleeves 148 are provided with bevel gears 150 and 152 which mesh with bevel gears 154 carried by a block 155 formed integral with the shaft 156. The gears 150, 152 and 154 and the shaft 156 thus comprise a differential mechanism. The shaft 156 carries a wheel 158 over which a belt chain 160 passes to drive a similar wheel 162 carried by a shaft 164. The shaft 164 carries a pair of cams formed by wheels 166 and 168, each provided with an offset lug 169 and 170, which lugs are adapted to contact respectively with the links 98 and 102 to move them from their operative to their inoperative position, whenever the shaft 164 is rotated by the differential mechanism to a predetermined point. The point at which the lugs 169 and 170 move the links 98 and 102 to their inoperative position is determined by the setting of the wheels 166 and 168 on the shaft 164. The position of the cams is determined by their adjustment with a notched sleeve 172 splined to the shaft 164. The sleeves carrying the wheels 166 and 168 and the sleeve 172 are maintained in their adjusted position by a nut 174 which holds the three sleeves against each other and the sleeve 166 against a shoulder on the shaft 164.

It is believed that the operation of my pitch-changing and limiting mechanism will be understood from the above description. Whenever the pilot desires to change the pitch, he operates one or the other of the rods 110 and 112 depending on whether he desires to increase or decrease the pitch. This movement operates, through the levers 104 or 108, the links 98 or 102 to rotate the shifting fork 86 in one direction or the other, thus shifting the clutch element 74 into engagement with one of the gear wheels 64 or 84. This drives the hub floating gear 48 either faster than or slower than the speed of rotation of the propeller shaft and thus rotates the gears 46 and through their gear trains, the worms 32 and the ring gears 30 to change the pitch of the two blades. The relative movement of the hub floating gear 48 and the propeller shaft 16 causes the bevel wheels 150 and 152 because of their geared connection through the wheels 122 and 124 to rotate at different speeds. Thereupon the bevel wheels 154 are forced to turn about the axis of the shaft 156 and the shaft 156 is rotated. Rotation of the shaft 156 drives the shaft 164 through the chain 160, and as soon as sufficient pitch-changing movement has occurred one or the other of the lugs 169 or 170 pushes the associated link 98 or 102 out of engagement with shifter fork 86 and the springs 94 return the shifter fork to neutral position, thus moving the clutch element to neutral and disengaging the clutch. The point at which this disengagement takes place depends upon the position of wheels 166 or 168 on the shaft 164.

It is to be understood that the above described embodiment of my invention is for the purpose of illustration only, and various changes may be made therein without departing from the spirit and scope of the invention.

I claim:

1. In a rotary propeller having blades mounted for adjustment to vary the pitch thereof and having means including a rotatable member for moving the blades to vary their pitch in one direction or the other according as the rotatable member is driven at a speed in excess of or less than propeller speed, a single rotary idler member, means for constantly driving said idler member during rotation of the propeller at a speed bearing a fixed relation to propeller speed, a pair of rotary idler members connected to said rotatable member and normally driven thereby, one at a speed proportionately in excess of propeller speed and the other at a speed proportionately less than propeller speed, and means for operatively connecting the single idler member to one or the other of said pair of idler members, to accordingly drive the rotatable member at a speed in excess of or less than propeller speed, further characterized in that said single idler member is slidably splined upon a sleeve having a gear wheel secured thereto and is driven by a gear secured to the propeller shaft and meshed with said last named gear wheel and in that said pair of idler members comprises a pair of gear wheels, each one having a slightly different diameter from the other and both meshed with said rotatable member and one being formed integral with a stub shaft which extends through said sleeve, and in that there is combined with said structure a differential gear, including a pair of bevel gears, a gear train from said stub shaft to one of said bevel gears and another gear train from said sleeve to the other bevel gear and means whereby said differential gear limits the variation in pitch.

2. In a rotary propeller having blades mounted for adjustment to vary the pitch thereof and having means including a rotatable member for moving the blades to vary their pitch in one direction or the other according as the rotatable member is driven at a speed in excess of or less than propeller speed, a single rotary idler member, means for constantly driving said idler member during rotation of the propeller at a speed bearing a fixed relation to propeller speed, a pair of rotary idler members connected to said rotatable member and normally driven thereby, one at a speed proportionately in excess of propeller speed and the other at a speed proportionately less than propeller speed, and means for operatively connecting the single idler member to one or the other of said pair of idler members, to accordingly drive the rotatable member at a speed in excess of or less than propeller speed, further characterized in that said single idler member comprises a clutch element slidably splined upon a sleeve having a gear wheel secured thereto and is driven by a gear secured to the propeller shaft and meshed with said last named gear wheel and in that said pair of idler members comprises a pair of gear wheels, each one of slightly different diameter from the other and both meshed with said rotatable member and one being formed integral with a stub shaft which extends through said sleeve, and in that there is combined with said structure a differential gear, including a pair of bevel gears, a gear train from said stub shaft to one of said bevel gears, another gear train from said sleeve to the other bevel gear, and a shaft extending through said bevel gears and carrying a pair of bevel gears meshed with the first named bevel gears and means whereby said differential gear limits the variation in pitch.

3. In a rotary propeller having blades mounted for adjustment to vary the pitch thereof and having means including a rotatable member for moving the blades to vary their pitch in one direction or the other according as the rotatable member is driven at a speed in excess of or less than propeller speed, a single rotary idler member, means for constantly driving said idler member during rotation of the propeller at a speed bearing a fixed relation to propeller speed, a pair of rotary idler members connected to said rotatable member and normally driven thereby, one at a speed proportionately in excess of propeller speed and the other at a speed proportionately less than propeller speed, and means for operatively connecting the single idler member to one or the other of said pair of idler members, to accordingly drive the rotatable member at a speed in excess of or less than propeller speed, further characterized in that said single idler member comprises a clutch element slidably splined upon a sleeve having a gear wheel secured thereto and is driven by a gear secured to the propeller shaft and meshed with said last named gear wheel and in that said pair of idler members comprises a pair of gear wheels, each one of slightly different diameter from the other and both meshed with said rotatable member and one being formed integral with a stub shaft which extends through said sleeve, and in that there is combined with said structure a differential gear, including a pair of bevel gears, a gear train from said stub shaft to one of said bevel gears, another gear train from said sleeve to the other bevel gear, a shaft extending through the bevel gears and carrying another pair of bevel gears meshed with the first named bevel gears, and means operated by said shaft for limiting the pitch-changing mechanism by disconnecting said idler members when the pitch has been varied to a predetermined point.

ELLIS D. McNEAL.